(12) United States Patent
Cobb

(10) Patent No.: US 9,840,225 B2
(45) Date of Patent: Dec. 12, 2017

(54) KC CHEST CLIP HAVING AN EXTENSION GUARD

(71) Applicant: Kristy L Cobb, Delta, AL (US)

(72) Inventor: Kristy L Cobb, Delta, AL (US)

(*) Notice: Subject to any disclaimer, the term of this patent is extended or adjusted under 35 U.S.C. 154(b) by 143 days.

(21) Appl. No.: 14/583,672

(22) Filed: Dec. 27, 2014

(65) Prior Publication Data

US 2015/0191147 A1    Jul. 9, 2015

Related U.S. Application Data

(60) Provisional application No. 61/924,642, filed on Jan. 7, 2014.

(51) Int. Cl.
*A44B 11/25* (2006.01)
*B60R 22/10* (2006.01)
*B60N 2/28* (2006.01)

(52) U.S. Cl.
CPC ........ *B60R 22/105* (2013.01); *A44B 11/2557* (2013.01); *B60N 2/2812* (2013.01); *B60N 2002/2815* (2013.01); *Y10T 24/2168* (2015.01); *Y10T 24/36* (2015.01); *Y10T 24/4002* (2015.01)

(58) Field of Classification Search
CPC ............ A44B 11/2557; A44B 11/2553; A44B 11/2546; B60R 22/105; B60R 2022/006; Y10T 24/2168; B60N 2002/2815; B60N 2002/2812; B60N 2/2812; B60N 2/265; B60N 2002/2818

USPC .................................................. 297/484, 487
See application file for complete search history.

(56) References Cited

U.S. PATENT DOCUMENTS

| 8,408,686 B2* | 4/2013 | Kobayashi | ............... B41J 2/175 347/85 |
| 2001/0048236 A1* | 12/2001 | Baloga | .................... B60N 2/286 297/250.1 |
| 2007/0102990 A1* | 5/2007 | Smith | .................. B60N 2/2812 297/484 |

* cited by examiner

*Primary Examiner* — Jack W Lavinder

(57) ABSTRACT

A child restraint harness system includes first and second shoulder straps that have button holes located on the y-axis of the straps and a chest clip device which consists of two separate connectors that join together to form the chest clip device. On each connector, there is an extension guard located on the inferior portion of the chest clip device. Also, on each extension guard, there is a button located inferior to the bottom shoulder strap slot. Once the first and second shoulder straps are threaded through the top shoulder strap slot and then threaded through the bottom shoulder strap slot, the extension guard located on the inferior portion of the chest clip device can be buttoned into the shoulder straps, which secures the chest clip device in the proper position so the child cannot move the chest clip in the downward position. Once the child grows to the next strap level on the safety seat, the chest clip can be unfastened and each extension on the connector can be unbuttoned and moved up to reach the proper placement of the chest clip on the child.

1 Claim, 4 Drawing Sheets

KC CHEST CLIP HAVING AN EXTENSION GUARD

CROSS-REFERENCE TO RELATED APPLICATION

This application claims benefit of U.S. Provisional Patent Application No. 61/924,642, filed on Jan. 7, 2014.

BACKGROUND

The standard child safety seat comes equipped with standard components, which includes a restraint harness system and a chest clip that are used to keep the shoulder straps in the proper position on the child and prevent the child from being ejected from the moving vehicle. However, a problem with the previous chest clip is it can be moved in the downward position so the child can free his or her arms from the shoulder straps and climb out of the safety seat. According to the National Highway Traffic Safety Administration, 59% of child restraint systems are not tight enough due to the chest clip not being placed in the proper position. Therefore, there is a need for a chest clip that has a guard with a button manufactured on the chest clip that will fasten into the shoulder straps, thus having button holes to prevent the child from moving the chest clip in the downward position once the chest clip guard has been buttoned into the shoulder straps.

SUMMARY

The present application describes a child restraint system with a chest clip that will have an extension with a button located on the extension and shoulder straps that have button holes located within the straps. The Child Restraint Harness will include a first shoulder strap having button holes located within the straps so the first chest clip connector can properly be attached to the first shoulder strap. The second chest clip connector will hold the second shoulder strap that has button holes located within the strap and buttons located on the chest clip extension guard. The extension guard is adjustable, therefore allowing the user to button into the button holes located on the shoulder straps at different levels.

DETAILED DESCRIPTION OF INVENTION

Figure 1:
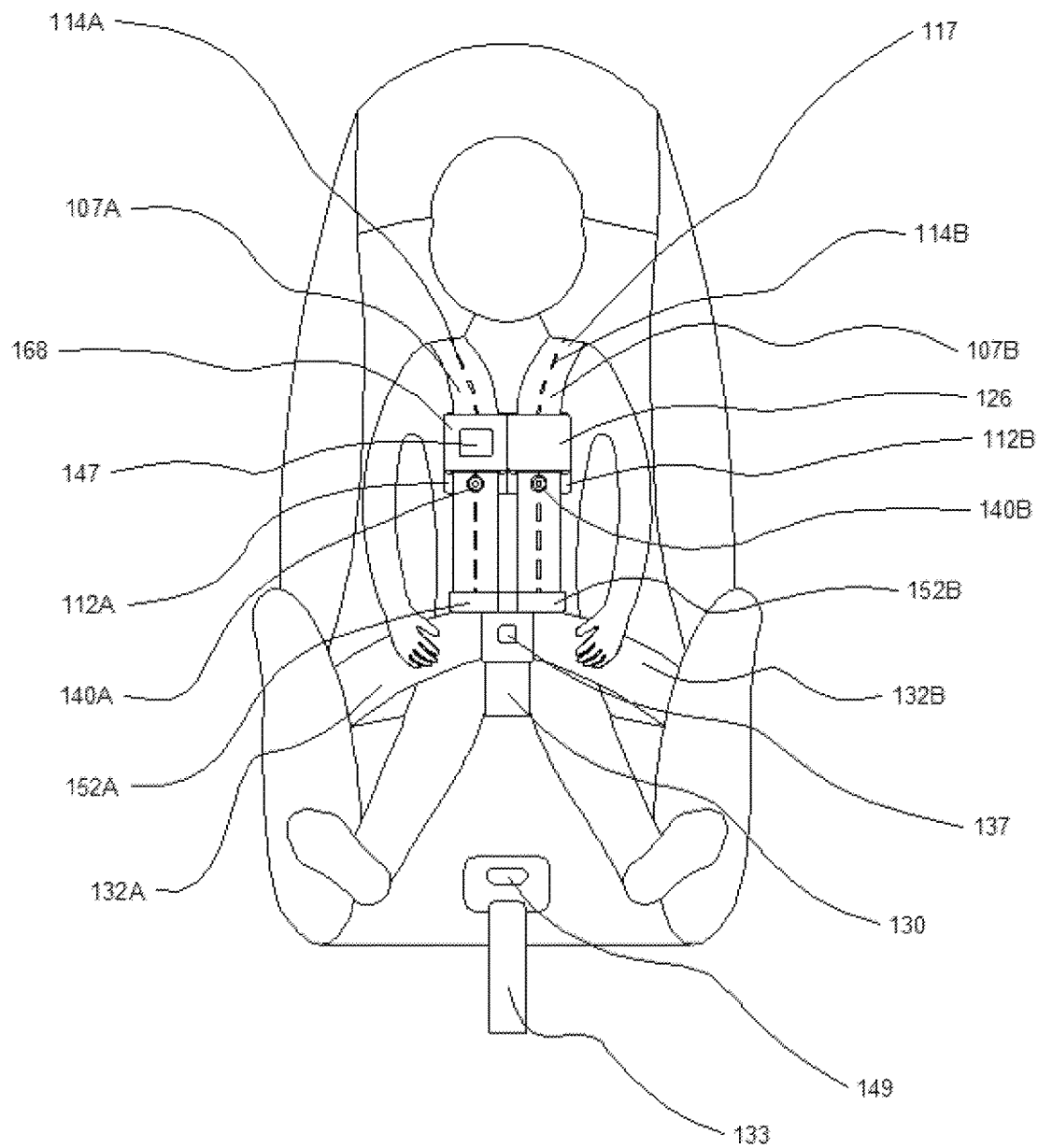
FIG. 1 is a schematic view illustrating an embodiment of a child restraint harness system.

FIG. 1 is a schematic view illustrating many embodiments of a child restraint harness system 117 that can include shoulder straps 107A and 107B, waist straps 132A and 132B, two fasteners 152A and 152B, a buckle 137 that is held by a crotch strap 130. One embodiment the child restraint harness system 117 can include is a first chest clip connector 168 that holds the first shoulder strap 107A and a second chest clip connector 126 that holds the second shoulder strap 107B, both forming the chest clip when fastened together. Another embodiment that is located on the inferior portion of the first chest clip connector 168 is an extension guard 112A that is joined in the downward position from the first chest clip connector 168 and an extension guard 112B that is located on the second chest clip connector 126 that holds the second shoulder strap 107B. The extension guards 112A and 112B include buttons 140A and 140B that are used to lock the chest clip in the correct position.

Figure 2:
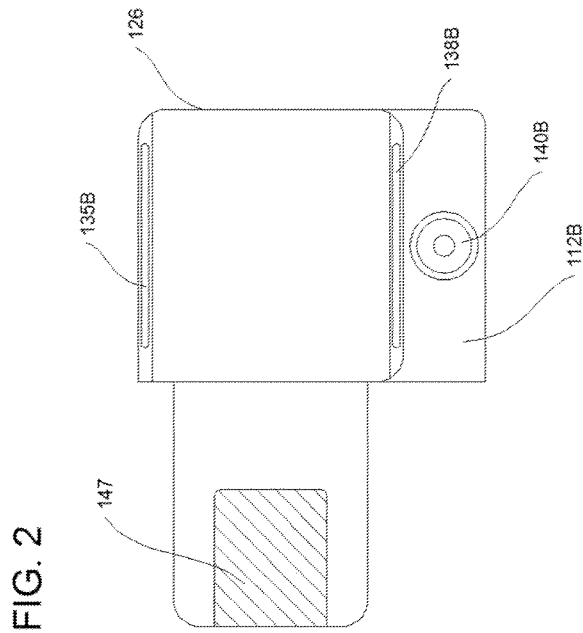
FIG. 2 is a schematic view illustrating the chest clip device in the detached state.

FIG. 2 it illustrates the chest clip in the detached state. One embodiment illustrated is the chest clip having top shoulder strap slots 135A and 135B and bottom shoulder strap slots 138A and 138B so the shoulder straps pass through the chest clips. FIG. 2 shows that the extension guard 112A can be located on the inferior portion of the first chest clip connector 168 and a second extension guard 112B can be located on the inferior portion of the second chest clip connector 126. FIG. 2 also illustrates a button 140A that is located on the extension guard 112A and is positioned inferior and centrally located to the bottom shoulder strap slot 138A. The second button 140B is located on the extension guard 112B and is positioned directly inferior and centrally located to the bottom shoulder strap slot 138B. The extension guards 112A and 112B can be manufactured on the chest clip device so that the chest clip can be managed easily without additional parts. The extension guards 112A and 112B can also be manufactured from the same material as the chest clip device. The extension guards 112A and 112B can be made thinner so when the shoulder straps 107A and 107B are passed through the shoulder strap slots 138A and 138B, the buttons 140A and 140B can be fastened into the shoulder straps 107A and 107B easily.

Figure 3:
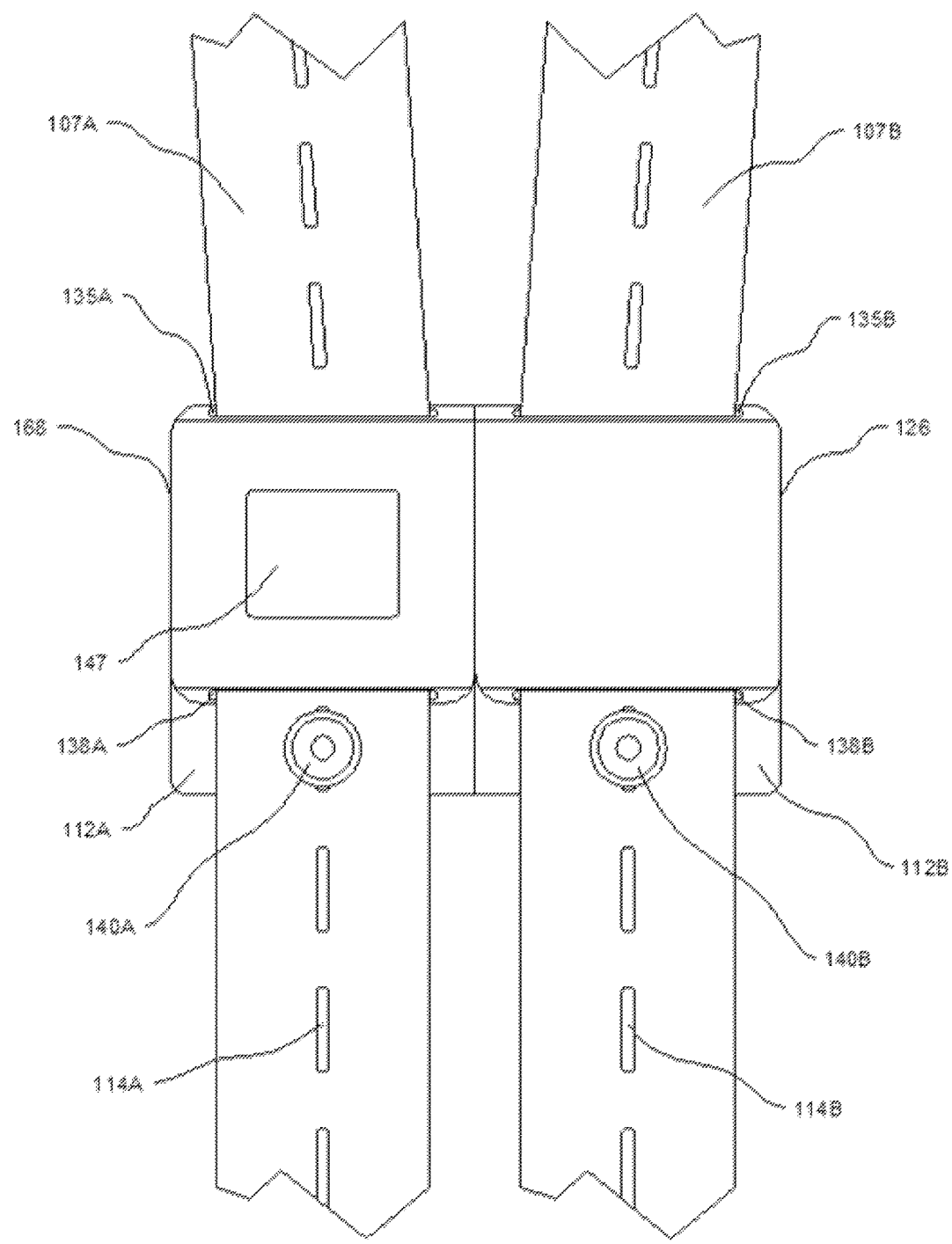
FIG. 3 illustrates a partial enlarged view that shows the chest clip extension guard attached to the shoulder straps and demonstrates the button fastened into the shoulder strap.

FIG. 3 illustrates a partially enlarged view that shows the chest clip extension guard 112A and 112B attached to the shoulder straps 107A and 107B and demonstrates the button 140A and 140B fastened into the shoulder straps 107A and 107B. One embodiment is the button holes 114A and 114B that are located vertically along the y-axis of the shoulder straps 107A and 107B. The button holes 114A and 114B are at different levels on the shoulder straps 107A and 107B to allow the chest clip extension guard 112A and 112B to be buttoned at the proper level for each child's height. Once the chest clip extension guards 112A and 112B are locked into the first shoulder strap 107A and the second shoulder strap 107B, the first chest clip connector 168 and the second chest clip connector 126 can be fastened together to secure the shoulder straps 107A and 107B on the child. Once the chest clip extension guards 112A and 112B are locked in position, the first and second shoulder straps 107A and 107B will be secure on the child's shoulders and will prevent the child from moving the chest clip in the downward position. In addition, FIG. 3 illustrates the first shoulder strap 107A threaded vertically through the top shoulder strap slot 135A then threaded through the bottom shoulder strap slot 138A. Additionally, it shows a button 140A fastened into the button hole 114A on the first shoulder strap 107A. It also illustrates the second shoulder strap 107B is threaded vertically through the top shoulder strap slot 135B and passed through the bottom shoulder strap slot 138B. In addition, the button 140B is buttoned into the second shoulder strap 107B. The chest clip extension guards 112A and 112B can be unbuttoned from the shoulder straps 107A and 107B and can be moved vertically and fastened into desired button holes 114A and 114B that are located at different levels. The purpose of the button's 140A and 140B location in the center of the bottom shoulder strap slots 138A and 138B is to ensure proper function when the chest clip extension guards 112A and 112B buttons 140A and 140B are buttoned in the center of the shoulder straps 107A and 107B and secured. The button holes 114A and 114B are manufactured into the webbing material from which the shoulder straps 107A and 107B are made. The button holes 114A and 114B must be smooth to ensure that the chest clip device can be managed easily.

Figure 4:
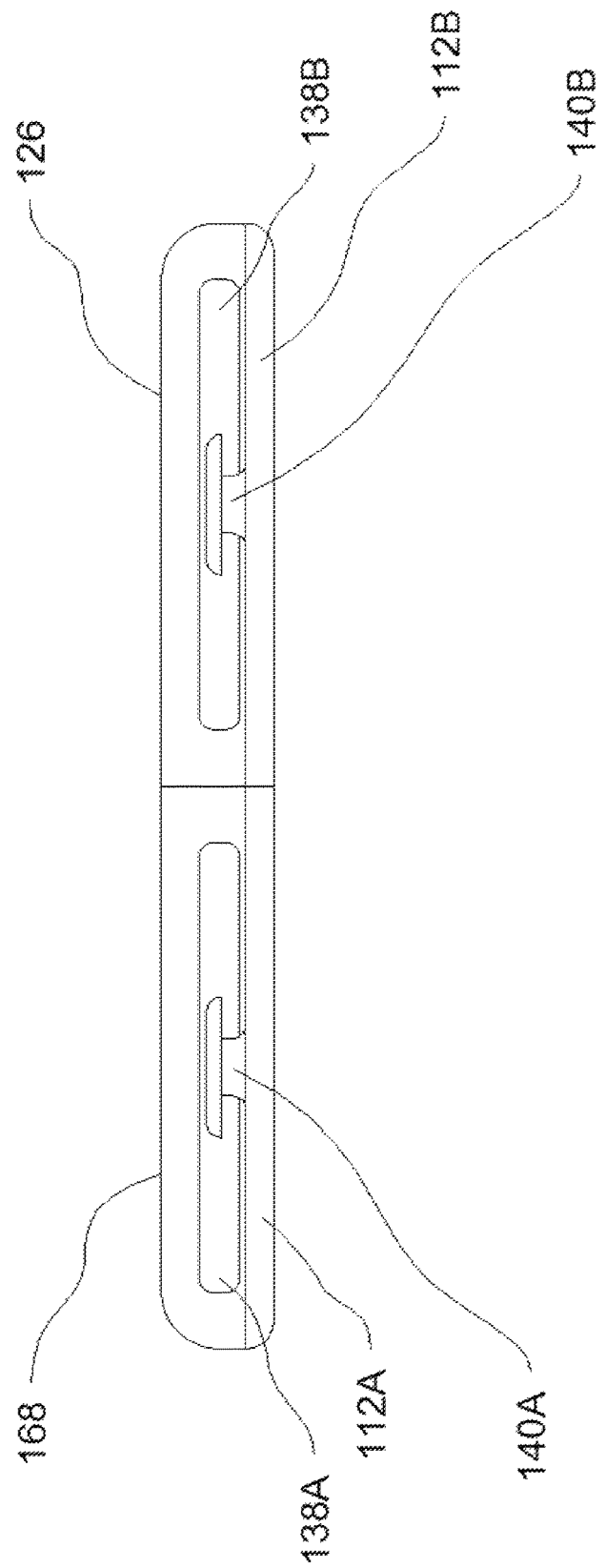
FIG. 4 is a cross-sectioned view of the inferior portion of the chest clip device illustrating the button attached to the extension guard.

FIG. 4 illustrates a cross-sectioned view of the inferior portion of the chest clip device. In one embodiment, the buttons 140A and 140B project from the chest clip extension guard 112A and 112B. In addition to what is shown, the buttons are located in the center of the bottom shoulder strap slots 138A and 138B. The first chest clip connector 168 and the second chest clip connector 126 are shown much thicker than that of the chest clip extension guards 112A and 112B on the inferior portion of the chest clip device. This is necessary so that the shoulder straps 107A and 107B can be easily attached to buttons 140A and 140B located on the chest clip extension guard without the user having any trouble in making the closure properly.

Although the above embodiments have been described specifically, a person skilled in this field can modify this design in different ways without losing the idea of the invention. The idea of the invention can be used on different devices, such as infant rear facing safety seats, infant/toddler front facing safety seats, high chairs, strollers or any device that requires a harness system requiring a chest clip device. The chest clip extension guards 112A and 112B can be manufactured together with the chest clip so the chest clip device and extension guards 112A and 112B are made into one device. The button holes 114A and 114B located on the shoulder straps 107A and 107B can be manufactured during the creation of the webbing design of the shoulders straps 107A and 107B so the button holes 114A and 114B will not have to be cut, causing weakening of the shoulder straps 107A and 107B. However, the button holes 114A and 114B can be manufactured any way the company sees fit. The chest clip extension guard 112A and 112B can be designed in many different shapes as desired. Any skilled person in this field will be able to understand the function and design of this patent. The chest clip extension guards 112A and 112B are a much needed device due to children moving the chest clip in the downward position, which puts them in danger. If the chest clip is not in the proper position at the level of the armpit and is at any other position, it can result in the child having a life threatening injury to the abdomen or, even worse, the child can free his or her arm and legs from the safety seat, thus freeing him or herself and putting him or her in greater danger of being thrown from the vehicle in the event of an accident.

The claims are as follows:

1. A chest clip device attached to and adjustable along a child restraint harness including first and second shoulder straps, each shoulder strap has a series of apertures located on a longitudinal center axis of each strap for positioning the chest clip device there along, the chest clip device comprises:
 a first chest clip connector and a second chest clip connector, each connector has
  a top shoulder strap slot aligned with a bottom shoulder strap slot,
  an extension guard extending from the bottom of the chest clip connector with a raised button centrally located thereon in a position central and aligned to said bottom shoulder strap slot,
  a fastener located on a side of the chest clip connector for connecting to the opposed chest clip connector,
 wherein said first shoulder strap is threaded through said top and bottom shoulder strap slots on said first chest clip and said second shoulder strap is threaded through said top and bottom shoulder strap slots on said second chest clip so that said straps, after passing from said bottom shoulder strap slots, are placed over said extension guard to selectively engage said button in one of said series of apertures located on said shoulder straps to prevent movement of said chest clip device along the child restraint harness and to provide said chest clip device with an ability to adjust along said straps to ensure proper fit.

\* \* \* \* \*